United States Patent
Sukehiro (10) Patent No.: US 7,174,289 B2
(45) Date of Patent: Feb. 6, 2007

(54) TRANSLATING SYSTEM AND TRANSLATING APPARATUS IN WHICH TRANSLATABLE DOCUMENTS ARE ASSOCIATED WITH PERMISSION TO TRANSLATE

(75) Inventor: Tatsuya Sukehiro, Osaka (JP)

(73) Assignee: Oki Electric Industry Co., Ltd., Tokyo (JP)

(*) Notice: Subject to any disclaimer, the term of this patent is extended or adjusted under 35 U.S.C. 154(b) by 980 days.

(21) Appl. No.: 09/797,709

(22) Filed: Mar. 5, 2001

(65) Prior Publication Data

US 2002/0002451 A1    Jan. 3, 2002

(30) Foreign Application Priority Data

Jun. 30, 2000 (JP) .............................. 2000-197516

(51) Int. Cl.
*G06F 17/28* (2006.01)

(52) U.S. Cl. ............................................. 704/7; 707/4

(58) Field of Classification Search ............... 704/2–8, 704/9; 707/9, 4; 709/229
See application file for complete search history.

(56) References Cited

U.S. PATENT DOCUMENTS

| 5,708,780 | A | * | 1/1998 | Levergood et al. .......... 709/229 |
| 5,784,564 | A | * | 7/1998 | Camaisa et al. ............. 709/224 |
| 5,987,402 | A | * | 11/1999 | Murata et al. .................. 704/2 |
| 6,119,078 | A | * | 9/2000 | Kobayakawa et al. ......... 704/3 |
| 6,347,316 | B1 | * | 2/2002 | Redpath ....................... 707/10 |
| 6,772,208 | B1 | * | 8/2004 | Dutta ........................... 709/225 |
| 6,807,534 | B1 | * | 10/2004 | Erickson ....................... 705/51 |

* cited by examiner

*Primary Examiner*—Richemond Dorvil
*Assistant Examiner*—Lamont Spooner
(74) *Attorney, Agent, or Firm*—Rabin & Berdo, P.C.

(57) ABSTRACT

A Web browser obtains a document in which a pointer indicative of an address in a translating unit has been defined among documents from an HTTP server unit. When translation is instructed by the user, the Web browser transmits a translation request message together with a URL of the document to the translating unit. The translating unit obtains the document corresponding to the supplied URL and transmits a translation result to the Web browser. A document whose translation is not permitted is prevented from being translated.

10 Claims, 8 Drawing Sheets

"http://www.g**.co.jp/index.html"

Fig. 7B

"http://"

Fig. 7C

"www.g**.co.jp"

Fig. 7D

"/index.html"

*Fig. 8*

```
<a href = "http://www.f**.co.jp/cgi-bin/wwwej.cgi">
<img src = "button.gif"> </a>
```

*Fig. 9A*

`<a href = "http://www.hoho.co.jp/index.html"> </a>`

*Fig. 9B*

`<a href = "http://www.f.co.jp/cgi-bin/wwwej.cgi?URL=http://www.hoho**.co.jp/index.html"> </a>`

TRANSLATING SYSTEM AND TRANSLATING APPARATUS IN WHICH TRANSLATABLE DOCUMENTS ARE ASSOCIATED WITH PERMISSION TO TRANSLATE

BACKGROUND OF THE INVENTION

1. Field of the Invention

The invention relates to a translating system and a translating apparatus suitable for being built into such a system. More particularly, the invention relates to a translating system which can translate only a document having a declaration intention of permission of the translation and to a translating apparatus of such a system.

2. Related Background Art

As a translation service which is provided through the Internet, for example, a service provided at a website with the domain name systransoft.com, has been known. However, a translating system for providing such a translation service has, for example, a translating server equipped with a translating engine, an HTTP (Hyper Text Transfer Protocol) server, and the like. The translation service by the translating system is provided by using the HTTP server as an interface.

The user of such a translation service first operates a terminal or the like connected to the Internet and requests the HTTP server for a predetermined input form to input a document (original sentence) to be translated by using HTTP browsing software (Web browser). Specifically speaking, when the user designates a URL (Uniform Resource Locator) in the input form, the Web browser requests the HTTP server for transmission of the input form corresponding to the URL.

When data in the input form is transmitted from the HTTP server to the Web server in response to such a transmitting request, the Web server displays an input form image corresponding to the input form. When the image of the input form is displayed, the user inputs a document to be translated into an input area in the input form image and, thereafter, instructs to translate. When the translation is instructed, the inputted sentence is supplied to the translating engine of the translating server through the HTTP server together with the translating instruction.

The translating engine translates the supplied sentence. A translation result is transmitted to the Web browser through the HTTP server. The Web browser displays an image corresponding to the supplied translation result. Thus, the user of the translation service can view the displayed translation result.

In such a translation service, in place of inputting the original sentence into the input form image as mentioned above, it is also possible to designate the URL of the document as a translation target and translate the document corresponding to the URL.

When such a translation service is provided, for example, if the URL of the translation target is designated by the operation of the terminal, the translating server obtains the document corresponding to the URL by predetermined software, supplies the obtained document to the translating engine, and supplies a translation result to the Web browser.

However, according to the above translation service, when the URL is designated as mentioned above, the document corresponding to the URL is translated as it is irrespective of the presence or absence of intention of permission of translation of a copyright holder or an administrator of the document, so that there is a fear that the document whose translation is not permitted is also translated.

SUMMARY OF THE INVENTION

The invention is made in consideration of the above problem and it is an object of the invention to provide a translating system for providing a translation service only with respect to a document having a declaration intention of permission of translation and a translating apparatus of such a system.

To accomplish the above object, according to the first aspect of the invention, there is provided a translating system comprising: a first server which holds a translating document whose translation is permitted; a terminal connected to the first server through a network; and a second server which obtains the translating document from the first server through the network and outputs its translation result to the terminal through the network, wherein translation permission information indicative of permission of translation of the translating document has been added to the translating document, and when a pointer indicative of an address of the translating document and a translation request message corresponding to the translation permission information are received from the terminal through the network, the second server obtains the translating document from the first server corresponding to the pointer and translates the translating document.

According to the second aspect of the invention, the translation permission information comprises a description of the operation for the translation request to the second server described in the translating document whose translation is permitted.

According to the third aspect of the invention, the translation permission information comprises a document in which the pointer indicative of the address of the translating document whose translation is permitted has been registered.

According to the fourth aspect of the invention, a link management unit which receives a registration request for requesting a registration of the translation permission information into the translating document together with the pointer indicative of the address of the translating document is provided for the second server, and the link management unit has:

a transmitter detecting unit which detects a transmitter of the registration request when the pointer and the registration request are received;

an authorized person detecting unit which detects an authorized person having an authorization for translation permission of the translating document as a target of the registration request;

a declaration intention confirming unit which confirms a declaration intention of the translation permission to the authorized person when the transmitter detected by the transmitter detecting unit does not coincide with the authorized person detected by the authorized person detecting unit; and a registering unit which registers the pointer supplied together with the registration request as translation permission information when the declaration intention of the translation permission is confirmed by the declaration intention confirming unit.

According to the fifth aspect of the invention, there is provided a translating apparatus which is connected to each of a server which holds a translating document whose translation is permitted and a terminal through a network, comprising:

a communication control unit which receives a pointer indicative of an address of the translating document whose translation is permitted and a translation request message including translation permission information showing that the translation of the translating document corresponding to the pointer has been permitted from the terminal through the network and obtains the translating document corresponding to the pointer from the server; and     a translating unit which translates the translating document obtained via the communication control unit when the communication control unit receives the translation request message,     wherein a translated sentence obtained by the translating unit is transmitted to the terminal through the communication control unit.

According to the sixth aspect of the invention, the translating apparatus disclosed in the fifth aspect of the invention further comprises a storing device which stores the translated sentence.

The above and other objects and features of the present invention will become apparent from the following detailed description and the appended claims with reference to the accompanying drawings.

DETAILED DESCRIPTION OF THE PREFERRED EMBODIMENTS

The invention can be applied to, for example, a translating system for providing a translation service in response to a request from a terminal connected via a network.

Figure 1:
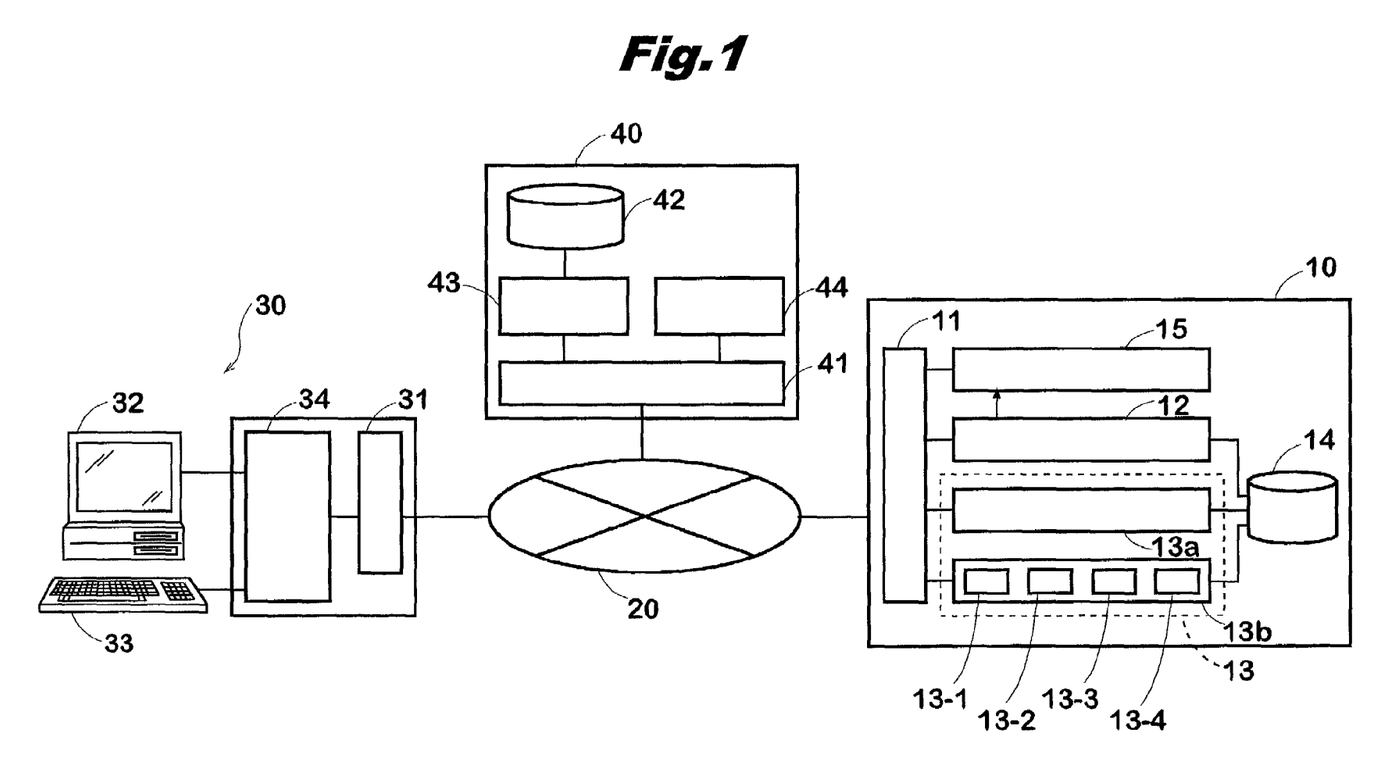
FIG. 1 is a block diagram schematically showing a construction of a translating system according to the invention.

FIG. 1 is a block diagram showing a construction of a translating system according to an embodiment of the invention. The translating system has: a translating server 10 for providing a translation service; a terminal 30 connected to the translating server 10 by a network 20 such as Internet; and an HTTP server 40 for providing an HTTP service.

The network 20 comprises a network such as Internet, LAN (Local Area Network), or the like. On the network, communication is performed by, for example, a TCP/IP protocol. A peculiar IP address is allocated to each of the translating server 10, terminal 30, and HTTP server 40.

The HTTP server 40 comprises, for example, a personal computer (PC), a workstation, or another information processing apparatus and has: a CPU; a memory; a hard disk drive (HDD) 42; an input/output device such as a network interface (NIC) or the like; and the like. The HTTP server 40 executes a communication control and a process such as an HTTP service or the like in parallel under the control of an operating system (OS), thereby realizing a communication control unit 41, an HTTP server unit 43, a mail transmitting and receiving unit 44, and the like in FIG. 1.

For example, the terminal 30 comprises a personal computer (PC), a workstation, or another information processing apparatus and has: a CPU; a memory; an HDD; an input/output device; a display unit 32; an input unit 33; and the like. The terminal 30 executes a communication control and a process such as an HTTP service browsing (Web browser) or the like in parallel under the control of the operating system (OS), thereby realizing a communication control unit 31, a Web browser 34, and the like in FIG. 1.

The user of the terminal 30 operates the input unit 33 and watches an image displayed on the display unit 32 by the Web browser 34, so that the user can use the HTTP service that is provided by the HTTP server 40 and the translation service that is provided by the translating server 10.

For example, the translating server 10 comprises a personal computer (PC), a workstation, or other information processing apparatus and has: a CPU; a memory; an HDD 14; an input/output device; and the like. An operating system (OS) to execute an operation control of the whole translating server 10, a program such as translation software, and data such as link information or the like have been recorded in the HDD 14. The translating server 10 executes a communication control and a process such as a translation service or the like under the control of the OS, thereby realizing a communication control unit 11, a translating unit 12, a link management unit 13, a mail transmitting and receiving unit 15, and the like in FIG. 1.

The communication control unit 11 distributes a TCP/IP packet as one unit of communication data which is transmitted and received to/from the translating server 10 through the network 20 to the translating unit 12, link management unit 13, mail transmitting and receiving unit 15, and the like in the translating server 10 in accordance with a port number in the packet.

In the translating server 10, a document described in, for example, Japanese, English, or the like is mutually translated by the translating unit 12 by using a well-known translating technique. A "translation request message" showing a translation request from the terminal 30 and a pointer such as a URL indicative of an address of a document as a translation target are supplied to the translating unit 12 through the network 20 and communication control unit 11. When the translating server 10 obtains a translating document (that is, a document to be translated) described by an HTML format, an XML format, or the like from the HTTP server 40 corresponding to the URL as a pointer, the translating unit 12 translates it. The translating server 10 supplies a translation result obtained by the translating unit 12 to the Web browser 34 of the terminal 30 through the communication control unit 11, network 20, and communication control unit 31. The terminal 30 displays an image corresponding to the supplied translation result onto the display unit 32 by the Web browser 34.

The translating server 10 transmits the translation result to the terminal 30 as mentioned above and records the translation result on the HDD 14 as a storing device. When the translation of the same document is again requested to the translating server 10, the translation result is read out and transmitted to the terminal 30. By recording the past translation result as mentioned above, the translation result can be transmitted without newly translating the document. Thus, a speed of the response to the translation request from the user at the time when the translation is requested again to the same document can be raised.

The characteristic operation of the translating system constructed as mentioned above will now be described hereinbelow.

Figure 7A:
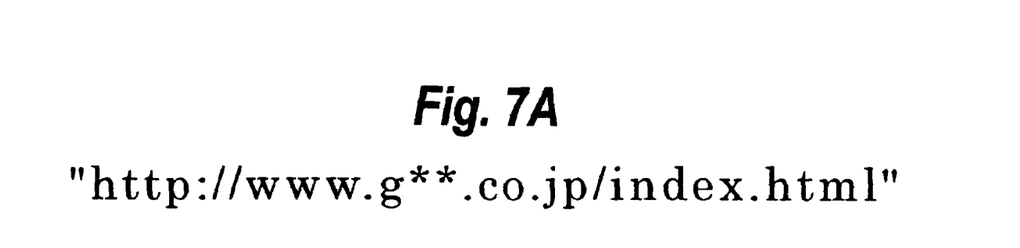
FIGS. 7A, 7B, 7C, and 7D show expressions that have been transferred from the text of this document to the drawings in order to avoid the risk of hyperlinks and/or other forms of browser-executable code in the text.
Figure 7B:
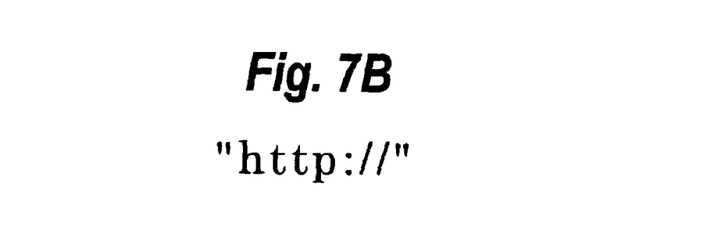

First, the user operates the input unit 33 of the terminal 30 and inputs an address (URL) of a translating document (original sentence) into an input form which is provided by the HTTP server 40. The URL is displayed, for example, as FIG. 7A. This URL includes the scheme name shown in FIG. 7B, the server name shown in FIG. 7C, and the path name shown in FIG. 7D.

Figure 7C:
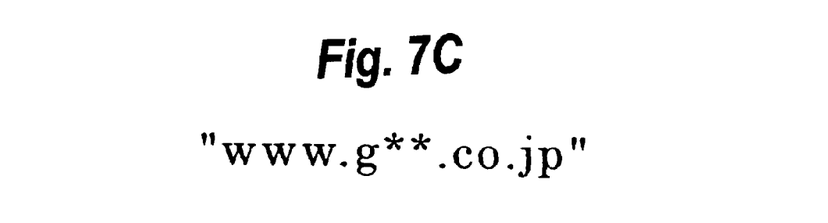
Figure 7D:
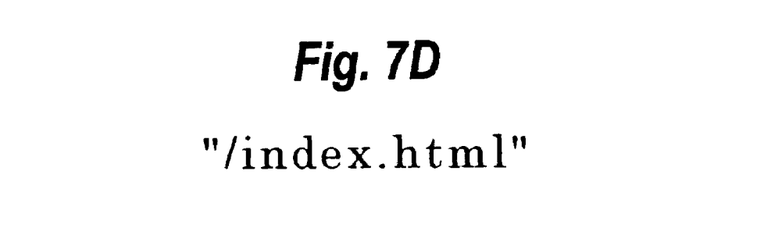

When the URL is designated, the Web browser 34 transmits a connecting request including at least the path name "/index.html" to the HTTP server 40 according to the server name shown in FIG. 7C. The connecting request is supplied to the server unit 43 of the HTTP server 40 through the communication control unit 31, network 20, and communication control unit 41 of the corresponding HTTP server 40.

When the connecting request is received, in response to the supplied connecting request, the HTTP server unit 43 reads out a file of the document corresponding to the path name from the HDD 42 and transmits it to the Web browser 34 of the terminal 30.

Among the documents which are supplied to the Web browser 34 as mentioned above, to the document whose translation has previously been permitted, a button linked to a document defining the operation to transmit a translation request command to the translating unit 12 (for example, what is called a CGI document describing the transmitting operation) has been allocated as translation permission information. According to the document to which such a button has been allocated, since the implementor has defined a link for the translation request to the translating unit 12 by himself, it is considered that there is a declaration intention of permission of translation.

Figure 8:
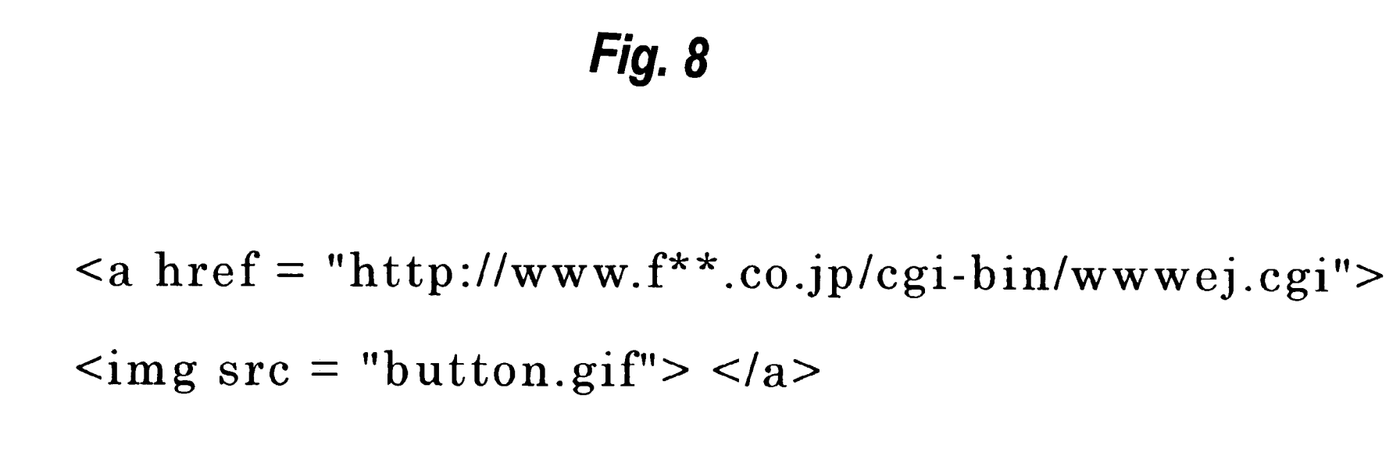
FIG. 8 also shows expressions that have been transferred from the text of this document to the drawings in order to avoid the risk of hyperlinks and/or other forms of browser-executable code in the text.

Specifically speaking, such a process for allocating the button as mentioned above is performed by the following method. That is, as a link for the translation request including the URL or the like of the translating unit 12, for example, the description as shown in FIG. 8 is added to the document whose translation is permitted. A file of the image data of the button of "button.gif" is recorded into a same directory on the HDD 42 as that of this document.

Figure 2:
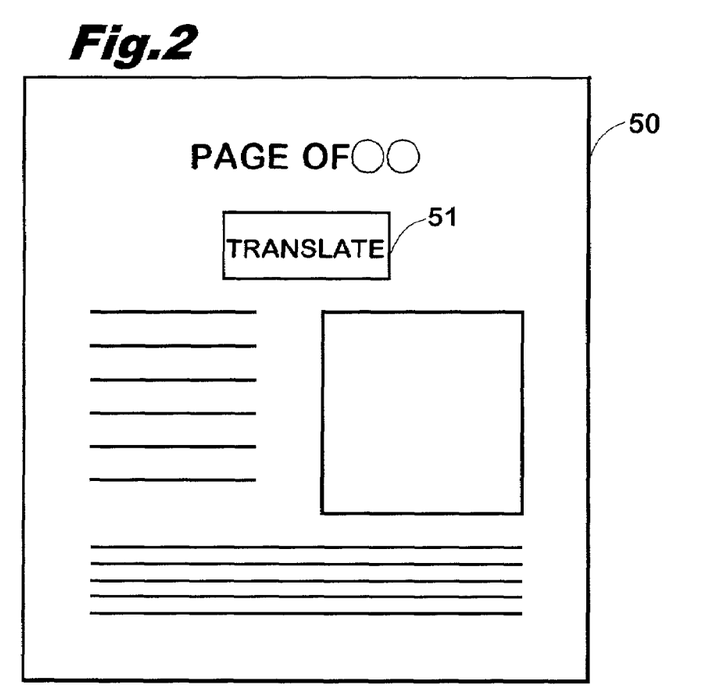
FIG. 2 is a diagram showing an example of an image of a document which is displayed on a display unit of a terminal of the translating system shown in FIG. 1.

Such a document file is supplied to the Web browser 34 of the terminal 30 through the communication control unit 41 of the corresponding HTTP server 40, the network 20, and the communication control unit 31 of the corresponding terminal 30. When the document to which the button has been allocated is supplied to the Web browser 34 of the terminal 30, the Web browser 34 transmits the file of the image data defined in the document to the HTTP server 40. Then, the Web browser 34 allows the file of the image data which is supplied from the HTTP server unit 43 to be displayed on the display unit 32, for example, as an image 50 as shown in FIG. 2 in accordance with the description of the relevant document.

When the user wants to translate the document displayed as mentioned above, he operates the input unit 33 and indicates an image 51 of the button in the image 50 displayed by the display unit 32. When the image 51 of the button is indicated, the Web browser 34 obtains a document in which the operation for transmitting the translation request has been defined, that is, a command in accordance with the link corresponding to the button. In response to the command, the terminal 30 transmits a translation request message for requesting the translating server 10 for the translation of the document.

Figure 3:
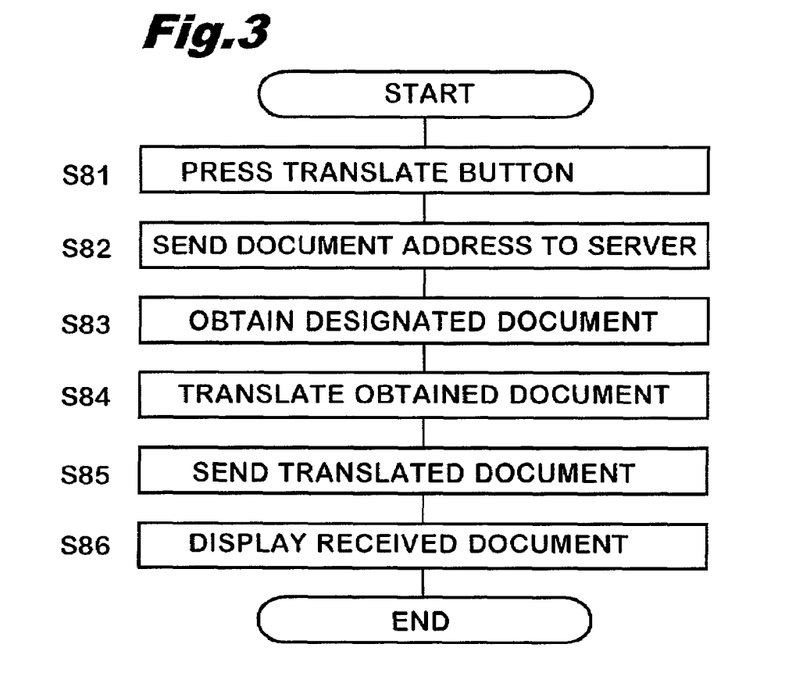
FIG. 3 is a flowchart showing the operation for requesting a translating server for translation from the terminal in the translating system according to the invention.

FIG. 3 shows processes by which the Web browser 34 of the terminal 30 requests the translating unit 12 of the translating server 10 to translate. When the Web browser 34 displays the foregoing document to which the button has been allocated, the processing routine starts from step S81.

First, the Web browser 34 waits until the image 51 of the button is indicated in step S81. When the image 51 of the button is indicated, step S82 follows. The URL showing the address of the document to which the button has been allocated is transmitted, for example, as an environment variable to the translating unit 12 of the translating server 10 together with the translation request message.

When the translating server 10 receives the URL indicative of the address of the document as a translation target together with the translation request message from the Web browser 34 of the terminal 30, the translating unit 12 obtains the document corresponding to the URL from the HTTP server unit 43 of the HTTP server 40 in step S83 and translates it into a predetermined language in next step S84. Subsequently, the translating server 10 transmits its translation result to the Web browser 34 of the terminal 30 in step S85.

When the Web browser 34 received the translation result, it allows an image corresponding to the supplied translation result to be displayed by the display unit 32 in step S86. Thus, the user can view the translated document. The translating process is finished.

As mentioned above, by translating the document to which the button describing the link for the translating unit 12 has been allocated by the implementor himself, only the document having the declaration intention of the translation permission can be translated. It is possible to prevent the document without a declaration intention of the translation permission from being translated.

If the link has been defined in the above document (original sentence) by the description of the pointer indicative of an address of another document, when the document is translated, the translating unit 12 changes the definition of the link to a description showing that the translation request of the document on the link destination side is transmitted.

For example, in a manner similar to a translating server apparatus disclosed in JP-A-10-283357, when a document linked to another document is translated, it is also possible to instruct the link management unit 13 to instruct the translation of another document on the link destination side.

Figure 9A:
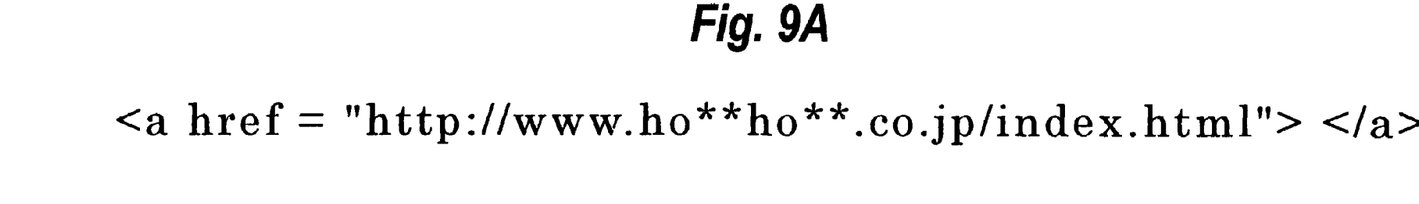
FIGS. 9A and 9B show more expressions that have been transferred from the text of this document to the drawings in order to avoid the risk of hyperlinks and/or other forms of browser-executable code in the text.
Figure 9B:
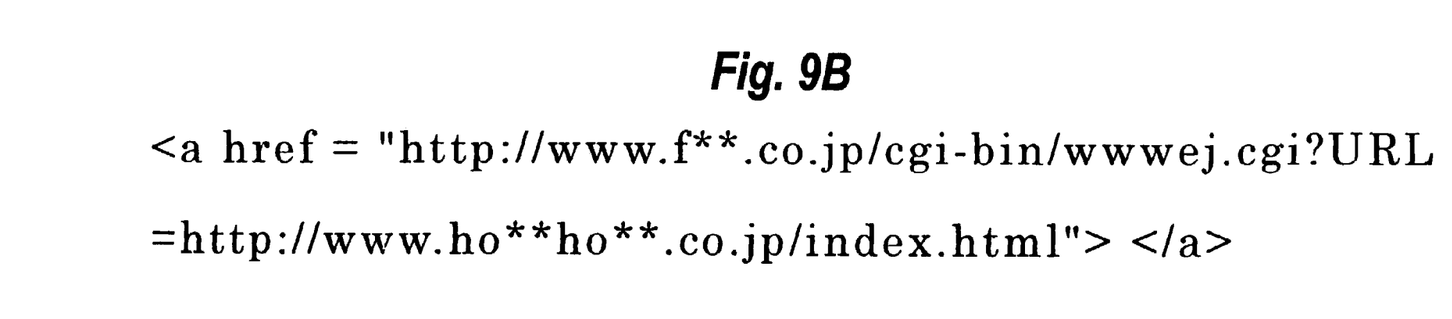

Specifically speaking, for example, the description of a link as shown in FIG. 9A is changed as shown in FIG. 9B.

When the user who views such a homepage after the translation as mentioned above instructs to display the link destination, the URL on the link destination side of the original sentence is supplied to the translating unit 12. The translation result of the document corresponding to the URL is supplied to the Web browser 34 of the terminal 30 and displayed onto the display unit 32.

The foregoing link management unit 13 comprises: an HTTP server unit 13a for providing a link collection (link database) obtained by collecting links for the addresses of the documents whose translation has been permitted by the copyright holder of the document or the administrator thereof; and a registration control unit 13b for performing a management of the addresses to be registered into the link collection and other processes.

The registration control unit 13b has: a transmitter detecting unit 13-1 for detecting a transmitter of a registration request when the pointer and the registration request to register the addresses into the link collection are received; an authorized person detecting unit 13-2 for detecting an authorized person having an authorization for translation permission of the translating document as a target of the registration request; a declaration intention confirming unit 13-3 for confirming a declaration intention of the translation permission to the authorized person when the transmitter detected by the transmitter detecting unit 13-1 does not coincide with the authorized person detected by the authorized person detecting unit 13-2; and a registering unit 13-4 for registering the pointer supplied together with the registration request as translation permission information when the declaration intention of the translation permission is confirmed by the declaration intention confirming unit.

Figure 4:
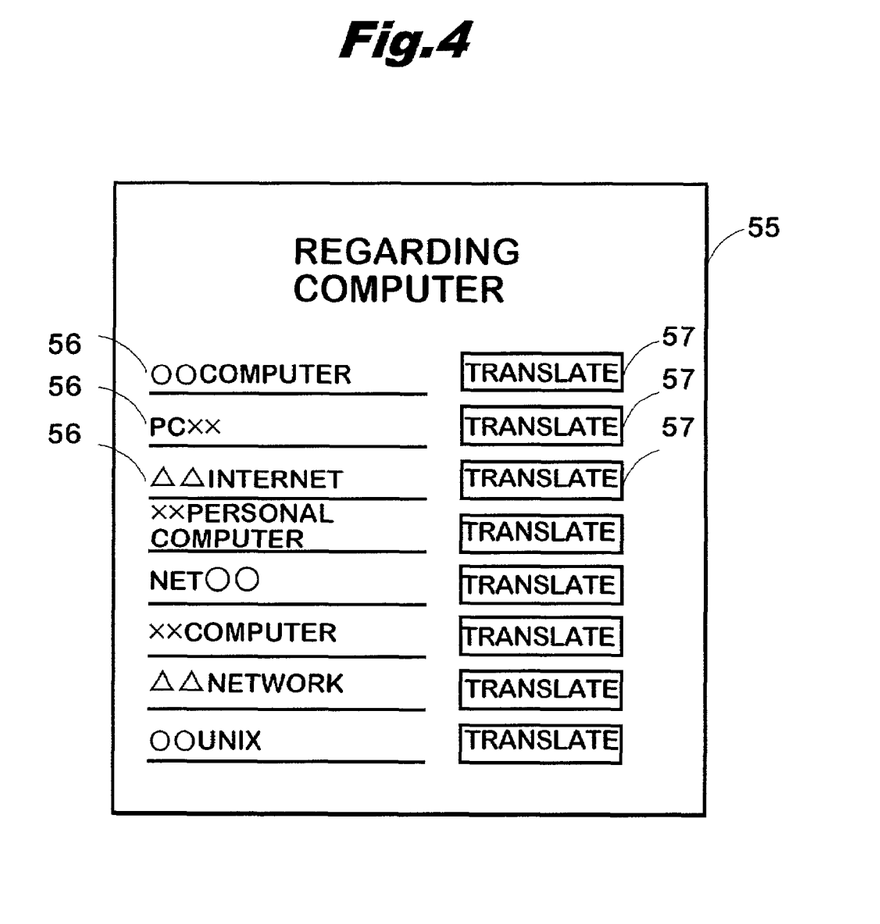
FIG. 4 is a diagram showing an example of an image of a link collection which is displayed on the display unit of the terminal of the translating system according to the invention.

The user of the terminal 30 can view the link collection provided by the HTTP server unit 13a by the Web browser 34. When the display of the link collection is instructed from the user by the operation of the input unit 33 of the terminal 30 by the user, as shown in, for example, FIG. 4, the Web browser 34 obtains data in the link collection from the HTTP server unit 13a of the translating server 10 and allows the display unit 32 to display an image 55 of a link collection in which information 56 showing the document on the link destination side whose translation is permitted and an image 57 of a button to instruct the translation of the document on the relevant link destination side have been displayed in correspondence to each other.

The registration of the document on the link destination side into the link collection as mentioned above is performed only to the document in which such a registration is requested by transmitting Email or a predetermined form in which the pointer such as a URL indicative of the address of the document on the link destination side and a predetermined description or the like regarding a registration requestor have been written and there is a declaration intention of the translation permission of the implementor of the document on the link destination side, its administrator, or the like.

Figure 5:
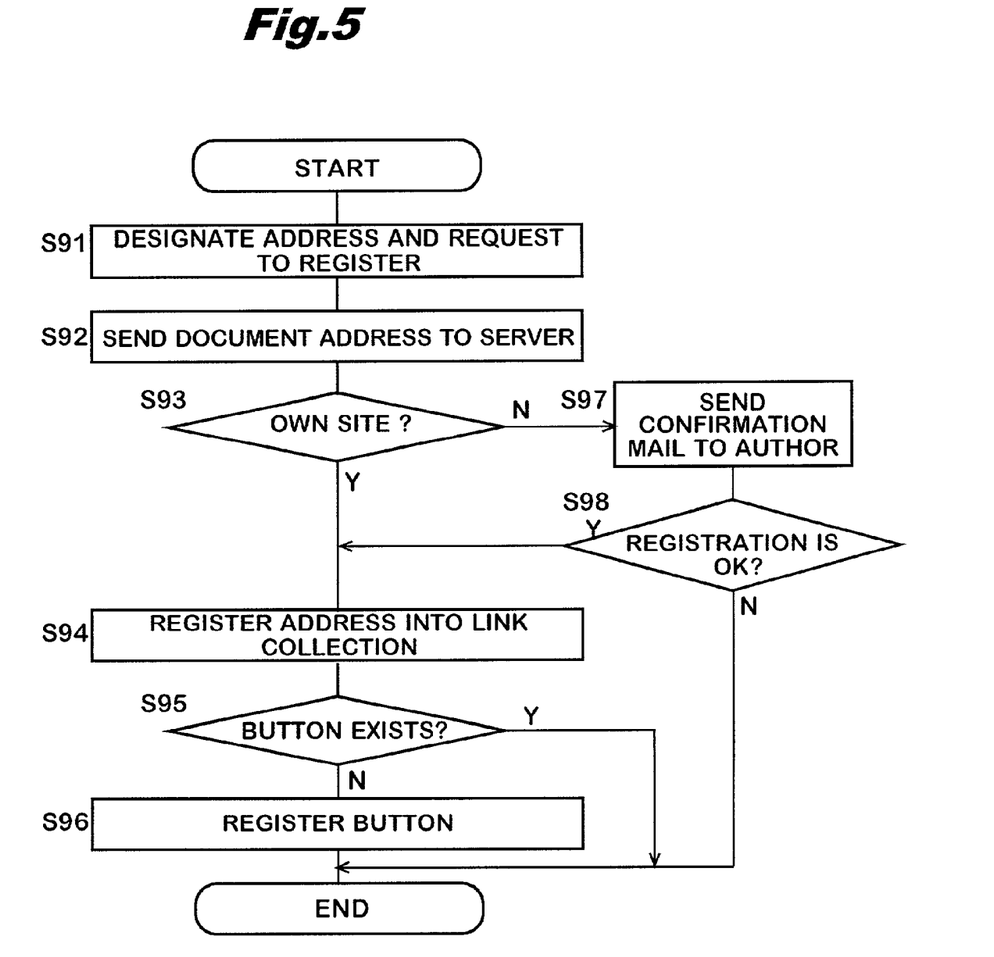
FIG. 5 is a flowchart showing the operation for registering a new link into the link collection in the translating system according to the invention.

FIG. 5 is a flowchart showing processes for such a registration request.

First, in step S91, the user of the terminal 30 as a registration requestor or the administrator of the HTTP server 40 transmits the mail of registration request in which the address (URL) of the document to be registered into the link collection, an indication of the requester himself, and the like have been written to the translating server 10. With respect to the registration request, it is also possible to construct it in a manner such that the URL of the document whose translation is permitted, an address of Email of the registration requester, and the like are written into the predetermined form which is provided by the HTTP server unit 13a of the translating server 10, and the resultant registration request is returned to the translating server 10.

In step S92, the registration request is transmitted to the translating server 10 through the network 20 and supplied to the registration control unit 13b through the communication control unit 11 and mail transmitting and receiving unit 15 of the server.

Subsequently, in step S93, the registration control unit 13b of the link management unit 13 provided for the translating server 10 discriminates whether the registration request relates to the document of the requestor himself or the document which is managed by the requestor or not in accordance with the URL or the like in the registration request. If NO, that is, if the registration request does not relate to the document of the requestor himself, step S97 follows. If YES, step S94 follows.

If the registration request relates to the document of the requestor himself or the document which is managed by the requestor, it is considered that there is the declaration intention of the translation permission. Whether the registration request relates to the document of the requestor himself or the document which is managed by the requestor or not can be discriminated, for example, in accordance with the description in the address of the transmitter of the mail of the registration request or in the predetermined form of the registration request or the like in the document of the URL to which the registration has been requested. For example, when the URL of the registration request is based on a server unit, and the transmitter of the mail is an administrator (WebMaster or the like) of the HTTP server 40 who manages the document, it is considered that the administrator himself made the declaration intention of the translation permission, or when the URL of the registration request is based on a directory unit of the user, and the transmitter of the mail is the holder of the directory, it is considered that the implementor himself made the declaration intention of the translation permission.

If the mail of registration request has a signature based on, for example, an encipherment of a public key system such as PGP or the like, it is considered that the mail has been issued by the signatory himself and that the signatory made the declaration intention of the translation permission.

In step S94, the registration control unit 13b of the link management unit 13 adds the address of the document to which the registration was requested to the link collection described by, for example, the HTML format and holds it into the HDD 14 of the translating server 10. The link collection is read out from the HDD 14 of the translating server 10 in response to an access request from the Web browser 34 or the like of the terminal 30 and supplied to the Web browser 34 through the communication control unit 11, the network 20, and the communication control unit 31 of the terminal 30.

In step S95, the registration control unit 13b of the link management unit 13 discriminates whether the button indicative of the permission of translation has been allocated to the document of the URL registered in the link collection or not. If the button has been allocated, the registering process is finished. If the button is not allocated, the button is registered into the list collection stored in the HDD 14 in step S96. The registering process is finished.

In step S93, if it is determined that the registration request does not relate to the document of the registration requestor himself or the document which is managed by the registration requester, step S97 follows. The translating server 10 transmits confirmation mail to the implementor or administrator of the document through the mail transmitting and receiving unit 15. For example, the confirmation mail is supplied to the mail transmitting and receiving unit 44 of the HTTP server 40 through the communication control unit 11, network 20, and communication control unit 41 and confirmed by the administrator or the like of the HTTP server 40. A response to the confirmation mail is returned from the mail transmitting and receiving unit 44 to the registration control unit 13*b* of the translating server 10 through the communication control unit 41, network 20, communication control unit 11, and mail transmitting and receiving unit 15.

When the translating server 10 receives the response to the confirmation mail, the registration control unit 13*b* discriminates whether there is the declaration intention of the translation permission or not in step S98. If YES, step S94 follows. In a manner similar to that mentioned above, the address to which the registration was requested is registered into the link collection and the button indicative of the permission of translation is registered. The processing routine is finished. If the response to the confirmation mail does not indicate the declaration intention of the translation permission, the URL to which the registration was requested is not registered into the link collection. The processing routine is finished.

As mentioned above, in the translating system which deals with the link collection, only the document having the declaration intention of the translation permission of the implementor or administrator is registered into the link collection. Therefore, only the document having the declaration intention of the translation permission can be registered into the link collection for instructing the translating unit 12 to translate. It is possible to prevent the document without the declaration intention of the translation permission from being translated.

Although the above embodiment has been described with respect to the case where the link management unit 13 for managing the registration into the link collection or the like is provided in the translating server 10 as shown in FIG. 1, it is not always necessary to provide the link management unit 13 into the translating server 10. For example, as shown in FIG. 6, a link management server 60 can be also separately provided.

In a manner similar to the translating server 10 and HTTP server 40 mentioned above, the link management server 60 comprises an information processing apparatus such as personal computer (PC) or workstation and has: a CPU; a memory; a hard disk drive (HDD) 62; an input/output device such as a network interface (NIC); and the like. The link management server 60 executes a communication control and a process such as an HTTP service or the like in parallel under the control of the operating system (OS), thereby realizing a communication control unit 61, a link management unit 63, and the like in FIG. 6.

In a manner similar to the link management unit 13 in FIG. 1, the link management unit 63 comprises: an HTTP server unit 63*a* for providing a link collection; and a registration control unit 63*b* for controlling the address registration of the document into the link collection. The link management server 60 also has a mail transmitting and receiving unit 64 for transmitting confirmation mail of the declaration intention of the translation permission to the administrator or the like of the URL in which the registration into the link collector was requested.

Figure 6:
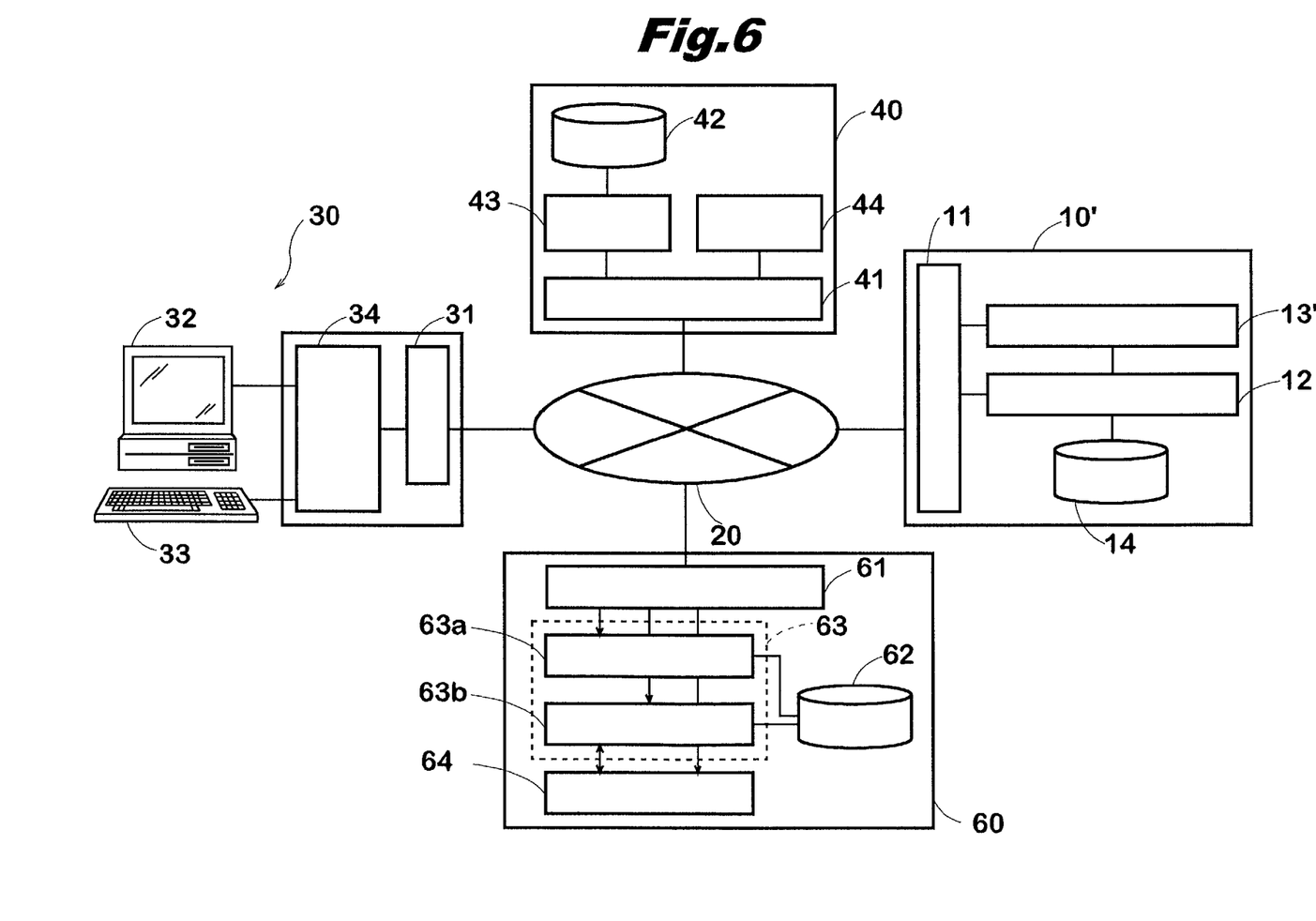
FIG. 6 is a block diagram which shows another embodiment of a translating system according to the invention and is similar to FIG. 1.

In the example shown in FIG. 6, in place of the link management unit 13 mentioned above, a translating server 10' can be also provided with an access management unit 13' for confirming whether the address is an address registered in the link collection of the HTTP server unit 63*a* or not and permitting a translation request to the translating unit 12 only with respect to the address registered in the link collection.

Consequently, a possibility that the document without a declaration intention of the translation permission is translated can be reduced.

According to the invention, when the pointer indicative of the address of the translating document having the translation permission information and the translation request message are received from the terminal, the translating server translates the translating document as mentioned above. Therefore, even if the translating server receives the pointer of the document having no translation permission information, it is possible to prevent the document whose translation is not permitted from being translated by the translating server.

The present invention is not limited to the foregoing embodiments but many modifications and variations are possible within the spirit and scope of the appended claims of the invention.

What is claimed is:

1. A language translating system comprising:
    a first server which holds a plurality of documents including one or more translatable documents for which translation is permitted;
    a terminal connected to said first server through a network which sends a connecting request including a pointer indicative of an address of a designated one of said plurality of documents, and receives said designated document from said first server in response to said connecting request; and
    a second server which obtains said designated document from said first server through said network and outputs a translated document to said terminal through said network if said designated document is determined to be one of said translatable documents,
    wherein translation permission information indicative of permission to translate has been added to each of said translatable documents held in said first server, and when said pointer indicative of an address of said designated document and a translation request message corresponding to said designated document and including the translation permission information corresponding to said designated document are received by said second server from said terminal through said network, said second server determines whether said designated document is one of said translatable documents, and if so, obtains said translatable document from said first server corresponding to said pointer and translates said translatable document.

2. A system according to claim 1, wherein said translation permission information added to each of said translatable documents includes a description of an operation for transmission of the corresponding translation request message by said terminal to said second server.

3. A system according to claim 2, wherein a button image is linked to said transmission operation description for each of said translatable documents and displayed on said terminal with a corresponding one of said translatable documents when said corresponding one of said translatable documents is designated in said connecting request.

4. A system according to claim 3, wherein said pointer and said translation request message corresponding to said translatable document are sent by said terminal to said second server in accordance with said operation description when said displayed button image is selected.

5. A system according to claim 1, wherein said second server includes a database in which a pointer indicative of an address of each of said translatable documents for which translation is permitted has been registered, and said second server determines whether said designated document is one of said translatable documents based on comparison of said pointer indicative of the address of said designated document with said pointers registered in said database.

6. A system according to claim 5, wherein said second server includes a link management unit which receives a registration request for requesting registration of the translation permission information corresponding to a given one of said translatable documents and said pointer indicative of the address of said given one of said translatable documents into said database, and said link management unit comprises:
- a transmitter detecting unit which detects a transmitter of said registration request when said pointer indicative of the address of said given one of said translatable documents and said registration request are received;
- an authorized person detecting unit which detects an authorized person having an authorization to grant translation permission for said given one of said translatable documents as a target of said registration request;
- a declaration intention confirming unit which confirms a declaration of intent to grant the translation permission by the authorized person when the transmitter detected by said transmitter detecting unit does not coincide with the authorized person detected by said authorized person detecting unit; and
- a registering unit which registers the pointer indicative of the address of said given one of said translatable documents and said registration request as said translation permission information when the declaration of intent to grant the translation permission is confirmed by said declaration intention confirming unit.

7. A system according to claim 1, further comprising:
- a third server connected to the network, said third server including a database for registering a pointer indicative of an address of each of said translatable documents for which translation is permitted, and a registration control unit for controlling the address registration of said translatable documents into said database.

8. A system according to claim 7, wherein said second server includes an access management unit for determining whether said designated document is one of said translatable documents based on comparison of said pointer indicative of the address of said designated document with said pointers registered in said database of said third server.

9. A system according to claim 1, wherein said network is the Internet.

10. A system according to claim 1, wherein said pointer indicative of an address of a designated one of said plurality of documents is a Uniform Resource Locator (URL).

* * * * *